Nov. 22, 1966 F. A. SCHWERTZ ET AL 3,287,161

METHOD FOR FORMING A THIN FILM RESISTOR

Filed Oct. 1, 1962

INVENTORS
FREDERICK A. SCHWERTZ
JOHN J. KINSELLA
BY
Stanley Z. Cole
ATTORNEY

United States Patent Office 3,287,161
Patented Nov. 22, 1966

3,287,161
METHOD FOR FORMING A THIN FILM RESISTOR

Frederick A. Schwertz, Pittsford, and John J. Kinsella, Rochester, N.Y., assignors to Xerox Corporation, Rochester, N.Y., a corporation of New York Filed Oct. 1, 1962, Ser. No. 227,328
2 Claims. (Cl. 117—212)

This invention relates to miniature electrical circuit components particularly to thin film resistors.

Thin film technology has contributed significantly to the microminiaturization of electrical circuitry. A thin film resistor, for example, may comprise a tiny nickel coated glass wafer merely a fraction of an inch in size.

Microminiaturization is further enhanced by combining circuit elements in the form of multi-layer circuit plates comprising dielectrc wafers having appropriately deposited layers of conductive, resistive, and dielectric material. As explained in our copending application Ser. No. 28,642, filed May 12, 1960, and now Patent No. 3,244,556, a circuit plate of this kind may be converted into a functional circuit by a series of stenciling and etching steps which determine the geometry of the separate layers. Provision may also be made to interconnect the active elements of two or more wafers, and, in this way, more complex circuits may be assembled without the benefit of soldered wire connections.

The electrical properties of thin film circuit components vary according to their physical dimensions. The electrical resistance of a thin film resistor is directly proportional to the length-to-width ratio of the electrical path provided by the resistive material and inversely proportional to its thickness. In thin film work it is convenient to consider the resistance provided by a square unit of resistive material and assign to this an ohm-square value. This value provides for easy calculation of the length-to-width ratio of the electrical path needed to provide a desired resistance. For example, to form a 400 ohm resistor on a substrate containing a resistive film of thickness corresponding to 100 ohm-square it would be necessary that the electrical path of the resistive material have a 4 to 1 length-to-width ratio.

It is also known that the electrical resistance of a material varies with changes in temperature. The fractional change in resistance (commonly expressed in parts per million per degree centigrade) is referred to as the temperature coefficient of resistance, which for convenience is designated TCR. Most metals are said to exhibit a positive TCR, that is, their electrical resistance increases with increases in temperature.

Although the TCR of most metals may generally be considered constant within reasonably small ranges of temperature change, the TCR of a thin film exhibits greater variation and is a function of film thickness. As a film is made thinner its TCR decreases and eventually becomes negative. Thus, the film thickness at which the TCR changes from positive to negative corresponds to zero TCR. For operating stability, it is generally desirable that the TCR of a resistor approach zero, especially where high value components are required.

Unfortunately, the ohm-square value corresponding to optimum thickness for stable temperature characteristics is relatively low, approximately 100–300 for commonly used resistive materials. This poses a problem with respect to high value resistors since the electrical length-to-width ratio must be varied accordingly. For instance, a 100,000 ohm resistor made from a 100 ohm-square wafer would require an electrical path with a length 1000 times its width. One known method of creating this long narrow electrical path comprises selective removal of the resistive film from a coated wafer in a series of closely spaced parallel adjustment lines. Since present methods for making these adjustment lines are time consuming and expensive, severe practical limitations are imposed on the upper limit of resistance obtainable.

Thus, the fabrication of thin film resistors of high value having stable temperature characteristics is a major problem. Uniformity in the ohm-square value of the resistor is also important, especially when the resistor is part of a circuit plate which is to be converted into a functional circuit as mentioned above.

A method for fabricating high yield low TCR thin film resistors is presented in the copending application simultaneously filed herewith by Mytych, Ser. No. 227,334. In brief, his method comprises abrading a layer of resistive material coated on a non-uniformly rough dielectric substrate until the desired resistance is achieved. His method also improves the temperature characteristics of the resistor. Starting with a layer that displays a highly negative TCR, the TCR is made to approach zero by selective removal of the most highly negative areas.

However, the invention disclosed by Mytych cannot be conveniently applied to microcircuit boards or to the mass production of single layer thin film resistors where uniformity of the ohm-square value is essential for flexibility and convenience in fabricating circuits. According to the Mytych invention, it is most suitable to separately abrade each resistor until the desired resistance is achieved as indicated by a monitoring ohm-meter. It follows, therefore, that a practicable method for producing stable high value resistors having uniform electrical characteristics is desirable and useful.

Accordingly, it is an object of the present invention to provide a high value low TCR circuit board having highly uniform electrical resistance characteristics.

Additional objects of this invention include the simplification of thin film resistor fabrication, and a practicable method for the mass production of highly uniform thin film resistors.

It has been found that these objects, and other objects and advantages as will occur to those skilled in the art, are achieved by the present invention. The fabrication of thin film resistors according to the present invention comprises a first step of appropriately preconditioning a uniformly smooth dielectric substrate to form a uniformly roughened surface. The dielectric substrate is then coated with resistive material of thickness to produce a layer characterized by a negative TCR. Appropriate surface processing of the resistive layer results in a high yield low TCR thin film resistor of uniform ohm-square value.

The present invention is described in connection with the accompanying drawings in which.

Figure 1:
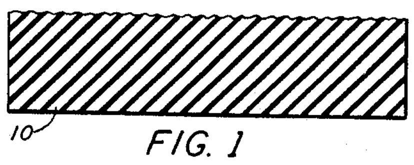
FIGURE 1 illustrates a substrate suitable for use in the present invention.

In FIGURE 1 is shown substrate 10 which may comprise any suitable dielectric material such as ceramics, glass, or the like. The surface finish of substrate 10 is preferably uniformly smooth to facilitate accurate control and insure uniformity of the electrical characteristics of a resistor formed according to the present invention. For instance, a glass microscope slide having a surface finish of approximately 0.1 microinch, as measured with a profilometer, is suitable for this purpose.

Figure 2:
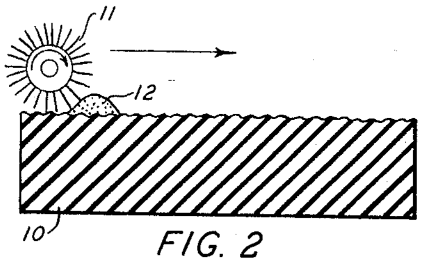
FIGURE 2 illustrates surface treatment of the substrate.

Before it is coated with resistive material, substrate 10 is processed in the manner illustrated in FIGURE 2.

Rotation of brush 11 causes abrasive slurry 12 to roughen the surface of substrate 10. Additionally, brush 11 is moved in a plane parallel to the surface of substrate 10 in a manner to effect uniform roughening. Aluminum oxide slurry has been used in the process described to produce a surface finish of 10 microinches on a glass microscope slide within allowable limits of consistency. However, other roughening methods may also be employed, such as sandblasting, chemical treatment, or the like.

Figure 3:
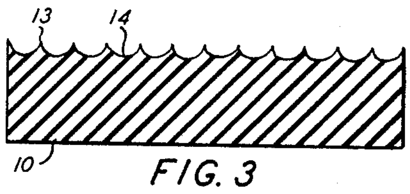
FIGURE 3 illustrates a uniformly roughened substrate.

FIGURE 3 illustrates the result of the described surface treatment. In effect, the roughened surface of substrate 10 comprises a continuous formation of minute raised portions or hills 13 and valleys 14, which in the interests of clarity have been shown greatly exaggerated.

The preconditioned substrate is then coated with a thin film of resistive material which may be done by heat evaporating resistive material in a vacuum chamber and allowing it to condense on a substrate placed in the vapor stream. The thin film of resistive material may be instead be applied by other known methods such as chemical reduction, spraying, and electron bombardment.

Figure 4:
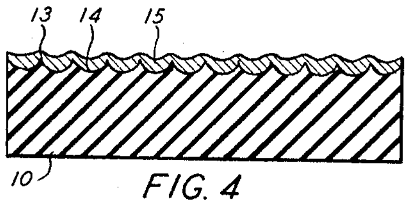
FIGURE 4 illustrates a wafer comprising a dielectric substrate coated with resistive material.

In FIGURE 4, is shown substrate 10 after it has been coated with layer 15 of resistive material. Layer 15 may comprise any of a larger number of resistive materials known to the art such as chromium, tin oxide, nickel-chromium alloys, nickel-chromium-silicone oxide, and the like. It is noted that the resistive material has a tendency to fill in the valleys 14 of substrate 10 thus forming a layer 15 of non-uniform thickness. Accordingly, those portions of layer 15 corresponding to the valleys are thicker and exhibit a more positive TCR than those portions corresponding to the hills which exhibit a highly negative TCR. These characteristics are used to advantage in the present invention to produce high value resistors with stable temperature characteristics.

Figure 5:
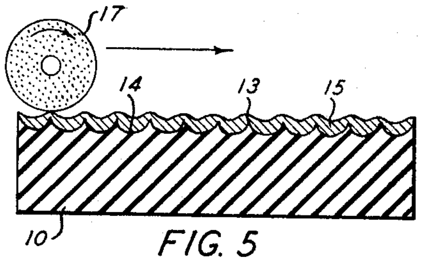
FIGURE 5 illustrates abrasion of the wafer.

FIGURE 5 shows surface processing of layer 15 whereby its electrical characteristics are improved. Layer 15 is subjected to the abrading action of broad area abrasion wheel 17 which is moved with relation to substrate 10 in the directions indicated by the arrows. Wheel 17 may suitably comprise ordinary rubber eraser material although other relatively soft abrasive material may also be used. This process removes resistive material mainly from the raised portions of layer 15 and, by thus uniformly selectively removing the thinner portions of resistive material the over-all resistance of layer 15 is increased and its TCR is made less negative.

Surface processing of layer 15 may also be accomplished by chemical means, if desired. For example, a cotton swab dipped in hydrochloric acid may be rubbed over layer 15 to dissolve away the thinner portions of resistive material. Other methods of chemical attack may also be used such as immersing the coated wafer in a suitable solvent or corrosive, such as hydrochloric acid or the like.

Figure 6:
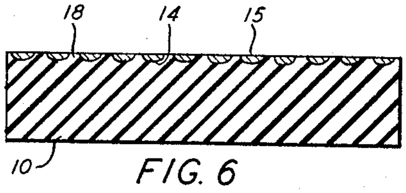
FIGURES 6 and 7 illustrate a thin film resistor fabricated according to the present invention.
Figure 7:
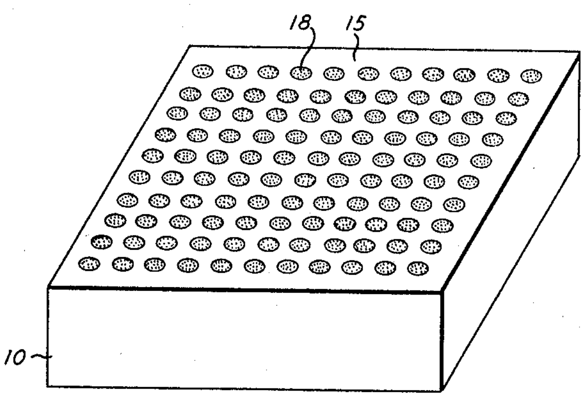

A resistor according to the present invention is shown in FIGURE 6 and FIGURE 7. Ridges 18, corresponding to micropeaks removed by the abrading action of wheel 17, constitute areas of theoretically infinite resistance.

Thicker deposits of resistive material remaining in valleys 14 exhibit a less negative or positive TCR, and the ohm-square value of resistance of the perforate layer formed is essentially constant throughout. This consistency is attributable to the preconditioning explained in connection with FIGURE 2 which produces a substrate surface of substantially uniform roughness. Accordingly, the resistor is especially suitable for use in microcircuit boards referred to above. Specifically, one or more layers may be added to the resistor formed in accordance with the present invention to form a complete circuit on a single substrate. Then by subjecting the multilayered complex to an etching process, the desired circuit characteristics may be achieved.

This invention may also be applied to the fabrication of a plurality of resistive components on, for instance, a printed circuit board. Chromium, or other suitable material, is first vacuum evaporated onto a dielectric printed circuit board appropriately masked to restrict deposition to particular areas. The separate resistive components thus formed may then be subjected to broad area abrasion, as described, resulting in components of uniformly high temperature stability and resistivity.

Limitation by the specific embodiments shown in this application is not intended. Rather, it is intended that the claims be interpreted broadly within the spirit and scope of this invention.

What is claimed is:

1. The method for forming a uniform thin film electrical resistor having a low temperature coefficient of resistance comprising:

(a) providing a dielectric substrate;

(b) forming on a surface of said substrate a uniform pattern of minute peaks and valleys;

(c) depositing on said surface a metallic layer having a negative temperature coefficient; and (d) substantially uniformly abrading said surface whereby a planar surface results, increasing the resistance of said layer and causing the temperature coefficient of resistance of said layer to approach zero.

2. The method of claim 1 wherein said metallic layer comprises chromium.

References Cited by the Examiner

UNITED STATES PATENTS

| | | | |
|---|---|---|---|
| 2,118,112 | 5/1938 | Schellenger | 117—213 |
| 2,906,648 | 9/1959 | Kohl | 117—107 X |
| 2,962,393 | 11/1960 | Ruckelshaus | 117—107 X |
| 3,015,587 | 1/1962 | MacDonald | 117—113 |

OTHER REFERENCES

Holland: "Vacuum Deposition of Thin Films," 1956, John Wiley and Sons, N.Y. (pp. 102 and 103 relied on).

ALFRED L. LEAVITT, *Primary Examiner.*

RICHARD D. NEVIUS, *Examiner.*

W. L. JARVIS, *Assistant Examiner.*